(12) United States Patent
Cutler

(10) Patent No.: US 8,245,043 B2
(45) Date of Patent: Aug. 14, 2012

(54) AUDIO START SERVICE FOR AD-HOC MEETINGS

(75) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1215 days.

(21) Appl. No.: 11/764,114

(22) Filed: Jun. 15, 2007

(65) Prior Publication Data

US 2008/0313713 A1    Dec. 18, 2008

(51) Int. Cl.
*H04L 29/06*    (2006.01)

(52) U.S. Cl. .............................. 713/176; 726/4; 709/245

(58) Field of Classification Search ...... 726/4; 713/176; 709/245
See application file for complete search history.

(56) References Cited

U.S. PATENT DOCUMENTS

| | | | |
|---|---|---|---|
| 3,118,340 A | 1/1964 | Iwerks | |
| 6,272,214 B1 | 8/2001 | Jonsson | |
| 6,792,092 B1 | 9/2004 | Michalewicz | |
| 6,853,716 B1 | 2/2005 | Shaffer et al. | |
| 6,879,565 B2 | 4/2005 | Baxley et al. | |
| 6,909,708 B1 | 6/2005 | Krishmaswamy et al. | |
| 6,934,370 B1 | 8/2005 | Leban et al. | |
| 7,006,456 B2 | 2/2006 | Rabipour et al. | |
| 7,020,337 B2 | 3/2006 | Viola et al. | |
| 7,031,499 B2 | 4/2006 | Viola et al. | |
| 7,054,820 B2 | 5/2006 | Potekhin et al. | |
| 7,058,168 B1 | 6/2006 | Knappe et al. | |
| 7,075,900 B2 | 7/2006 | Peters | |
| 7,099,510 B2 | 8/2006 | Jones et al. | |
| 7,197,186 B2 | 3/2007 | Jones et al. | |
| 7,212,651 B2 | 5/2007 | Viola et al. | |
| 7,801,971 B1 * | 9/2010 | Amidon et al. | 709/217 |
| 2004/0263611 A1 | 12/2004 | Cutler | |
| 2004/0263636 A1 | 12/2004 | Cutler et al. | |
| 2005/0018687 A1 | 1/2005 | Cutler | |

(Continued)

FOREIGN PATENT DOCUMENTS

JP    1996125835 A    5/1996

OTHER PUBLICATIONS

Yi ju Wu/Shigeru Shimamoto, "A study on DWT-Based Digital Audio Watermarking for Mobile Ad Hoc Network", IEEE Jun. 2006 pp. 247-251.*

(Continued)

*Primary Examiner* — Jeffrey Pwu
*Assistant Examiner* — Michael D Anderson
(74) *Attorney, Agent, or Firm* — Lyon & Harr, L.L.P.; Craig S. Fischer

(57) ABSTRACT

An audio start service method for enabling and scheduling ad hoc distributed meetings. Only a short (in some embodiments less than or equal to about 32 bits) unique device identification is needed to enable distributed meeting devices participating in the meeting to rendezvous at a common rendezvous network address. Once the participants know the unique meeting network address they can take part in the meeting, while others can join or leave the meeting. The data string is each device's unique identification that is encoded into an inaudible watermark and continuously exchanged between devices over the telephone network. A first distributed meeting device requests a network address from a distributed meeting server. This unique meeting network address then is sent to an audio start service that identifies "buddies" of the first device and sends out meeting invitations and the network address to other devices so they can join the meeting.

16 Claims, 9 Drawing Sheets

U.S. PATENT DOCUMENTS

2005/0073964 A1    4/2005    Schmidt et al.
2005/0190768 A1    9/2005    Cutler
2006/0149740 A1*   7/2006    Tsutazawa et al. .............. 707/9
2006/0200673 A1*   9/2006    Zhang et al. .................. 713/176
2007/0168553 A1*   7/2007    Jones et al. ................... 709/245

OTHER PUBLICATIONS

Eui-Hyun Jung/Seong-Yun Cho, "A Robust Digital Watermarking System Adopting 2D Barcode against Digital Piracy on P2P Network", Citeseerx 2006 pp. 263-268.*

ITU, Series V: Data communication over the telephone network, Aug. 1996.

Kellogg, W. A., T. Erickson, T. V. Wolf, S. Levy, J. Christensen, J. Sussman, W. E. Bennett, Leveraging digital backchannels to enhance user experience in electronically mediated communication, 20th Anniversary Conf. on Comp. Supported Cooperative Work, 2006, CSCW '06, pp. 451-454.

Kirovski, D., H. S. Malvar, Spread-spectrum watermarking of audio signals, IEEE Transactions on Acoustics, Speech, and Signal Processing, Apr. 2003, pp. 1020-1033, vol. 51, No. 4.

Schulzrinne, H., J. Rosenberg, The session initiation protocol: Internet-centric signaling, IEEE Comm. Magazine, Oct. 2000, p. 134-141.

Seligmann, D. D., R. T. Mercuri, J. T. Edmark, Providing assurances in a multimedia interactive environment, Proc. of the SIGCHI Conf. on Human Factors in Computing Sys., 1995, pp. 250-256, Denver, Colorado, United States.

* cited by examiner

| DMD-ID | Buddies | DMS-URI |
|---|---|---|
| 000001h | 000002h | http://www.placeware.com/cc/microsoft/join?id=... |
| 000002h | 000001h | http://www.placeware.com/cc/microsoft/join?id=... |

FIG. 8

| DMD-ID | Buddies | DMS-URI |
|---|---|---|
| 000001h | 000002h, 000003h | http://www.placeware.com/cc/microsoft/join?id=... |
| 000002h | 000001h, 000003h | http://www.placeware.com/cc/microsoft/join?id=... |
| 000003h | 000002h, 000003h | http://www.placeware.com/cc/microsoft/join?id=... |

FIG. 9

AUDIO START SERVICE FOR AD-HOC MEETINGS

BACKGROUND

Ad hoc meetings are frequent in a business environment. Ad hoc meetings are meetings that are scheduled at the spur of the moment and typically contain only a few participants. By way of example, assume a businessman telephones a businesswoman to have a telephonic meeting. During the meeting they both realize that they need to share some data or video. One way they could schedule this ad hoc meeting to exchange data or video is by using a scheduling application (such as Microsoft® Office Outlook®) schedule the meeting and e-mail the data or video. One problem with this method is that the data or video could be quite large and make take a long time to attach or send. Another way this ad hoc meeting could occur is by both parties agreeing to rendezvous at a certain network address on a network. It should be noted that this network could be a local area network or a wide area network (such as the Internet). Moreover, the term "network address" is used generically to refer to any computer network identifier such as an identifier for a computer or device on a TCP/IP protocol network (an IP address), a Session Initiation Protocol (SIP), or a Uniform Resource Identifier (which includes Uniform Resource Locator (URL) and Uniform Resource Name (URN). This method, however, is prone to error since network addresses are notoriously long and difficult to communicate audibly.

Another way to schedule ad hoc meetings is to use a distributed meeting (DM) technique. DM techniques provide multi-party conferencing and recording of meetings. By way of example, one way to schedule ad hoc meetings using this technique is by using multiple DM devices, such as cameras, microphones, and speakers. These techniques typically use an audible audio watermark. In general, an audible audio watermark includes using any conventional audio-based encoding method, such as DTMF or MFSK encoding. The advantage of using an audible watermark is that it can have a relatively short duration (as compared to an inaudible watermark) while transmitting the same amount of data. For example, a typical network address can be transmitted in an audible watermark having duration of a few hundred milliseconds, while an inaudible watermark would require several full seconds to transmit the same address. One disadvantage, however, with audible watermarks is that they can be altered by mixers and other audio processing equipment.

One such DM technique transmits an entire network address of a rendezvous point on the Internet using an audible or inaudible audio watermark. This gives each participant a location of where the data or video can be seen. This technique typically uses an audible watermark since the data transfer it much faster than an inaudible watermark. The inaudible audio watermark includes altering the frequency spectrum of an audio signal to embed a pattern. This pattern represents the data being encoded, which in this case is the network address. The inaudible watermark is low-amplitude noise that is inaudible to humans. The advantage of using an inaudible watermark is that it is not distracting to meeting participants as there is no audible noise to interrupt a participant's train of thought. However, as stated before a network address can be quite long, and when done with an inaudible watermark at a low-bit rate it would take quite long time to receive the entire network address (on the order of minutes at a low-bit rate). Thus, using inaudible watermarks to transmit a network address is impractical.

Another way to schedule ad hoc meetings is by using an Instant Messaging (IM) application. There are plug-ins that can be used for IM applications that can commence a DM session. The problem with this method is that all meeting participants must be running the IM application, and not everyone uses an IM application. In reality, the telephone network is much larger and has many times more users than use IM applications. Thus, methods that leverage the telephone network as a way to start an ad hoc meeting are more practical.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The audio start service method includes scheduling and enabling ad hoc distributed meetings. The distributed meetings are meetings that use distributed meeting devices and/or a software client/service (such as Microsoft®'s Live Meeting®) to exchange data and video at a common network address. A distributed meeting server allows all the distributed meeting (DM) devices that are participating in the meeting to meet at a single network address to conduct the meeting. The audio start service method is particularly well suited for ad hoc meetings because scheduling and enabling is done automatically and without much effort by the participants.

The general idea of the audio start service method is that only a short data string is needed to enable the DM devices to rendezvous at some network address. In some embodiments, the data string is a short unique device identification (ID). In some embodiments, the unique device ID is less than 24 bits long, while in alternate embodiments the unique device ID is between from about 24 to 32 bits in length, and in other embodiments the unique device ID is greater than 32 bits long. As long as potential meeting participants are running a distributed meeting application then they can obtain the network address at which to rendezvous. Once the participants know the network address they can take part in the meeting, others can join the meeting, and others can leave the meeting.

The audio start service method generates a unique device ID for each DM device. This unique device ID then is encoded into an inaudible watermark and transmitted over a telephone network to other DM devices. In turn, the other DM devices send their inaudible watermark over the telephone network. One way to look at this is that the inaudible watermarks are exchanged between DM devices participating in the meeting. In some embodiments, the transmission of the inaudible watermark is continuous over the telephone network as long as the DM device is participating in the meeting.

The inaudible watermarks have the advantage that they will not interrupt the voice conversations occurring over the telephone network. Generally, inaudible watermarks basically encode low-amplitude noise signals and speech patterns at a low bit rate. By way of example, if the bit rate is one bit per second it could take up to 24 seconds to obtain a 24-bit watermark. Inaudible watermarks can be continuously transmitted over the telephone network without interrupting the flow of the meeting.

The audio start service method uses at least two DM devices. These devices also include a DM application. The system also includes an distributed meeting server that facilitates and connects all of the DM devices together and initially provides the network address where the DM devices can rendezvous and conduct the meeting. In addition, the system includes an audio start service that generates an audio start service table to keep track of the meeting participants. This table can change dynamically. When a DM device joins, the audio start service automatically sends the DM device a meeting invitation and the network address. When a DM device leaves the meeting, the audio start service removes the unique device ID of the DM device from the audio start service table.

The audio start service method includes generating unique device IDs for each DM device. The IDs are encoded into inaudible watermarks and exchanged between DM devices. Each DM device generates a "buddies" list that represents those DM devices with which inaudible watermarks are being exchanged. A first DM device sends its unique device ID and its buddy list to the audio start service such that the audio start service table can be created. In addition, the first DM device sends a meeting request to the DM server and receives back a network address. This network address is sent by the first DM device to the audio start service and is added to the audio start service table. The DM server then facilitates data and video transfer at the network address to allow the meeting. When additional DM devices want to join the meeting they notify the audio start service and receive the network address where they can rendezvous with the first DM device and other DM devices participating in the meeting. If a DM device leaves the meeting its unique device ID is removed from the audio start service table.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 8 illustrates an exemplary implementation of the audio start service table at time T1 as shown in FIG. 7.

FIG. 9 illustrates an exemplary implementation of the audio start service table at time T2 as shown in FIG. 7.

DETAILED DESCRIPTION

In the following description of the audio start service method, reference is made to the accompanying drawings, which form a part thereof, and in which is shown by way of illustration a specific example whereby the audio start service method may be practiced. It is to be understood that other embodiments may be utilized and structural changes may be made without departing from the scope of the claimed subject matter.

I. System and Operational Overview

Figure 1:
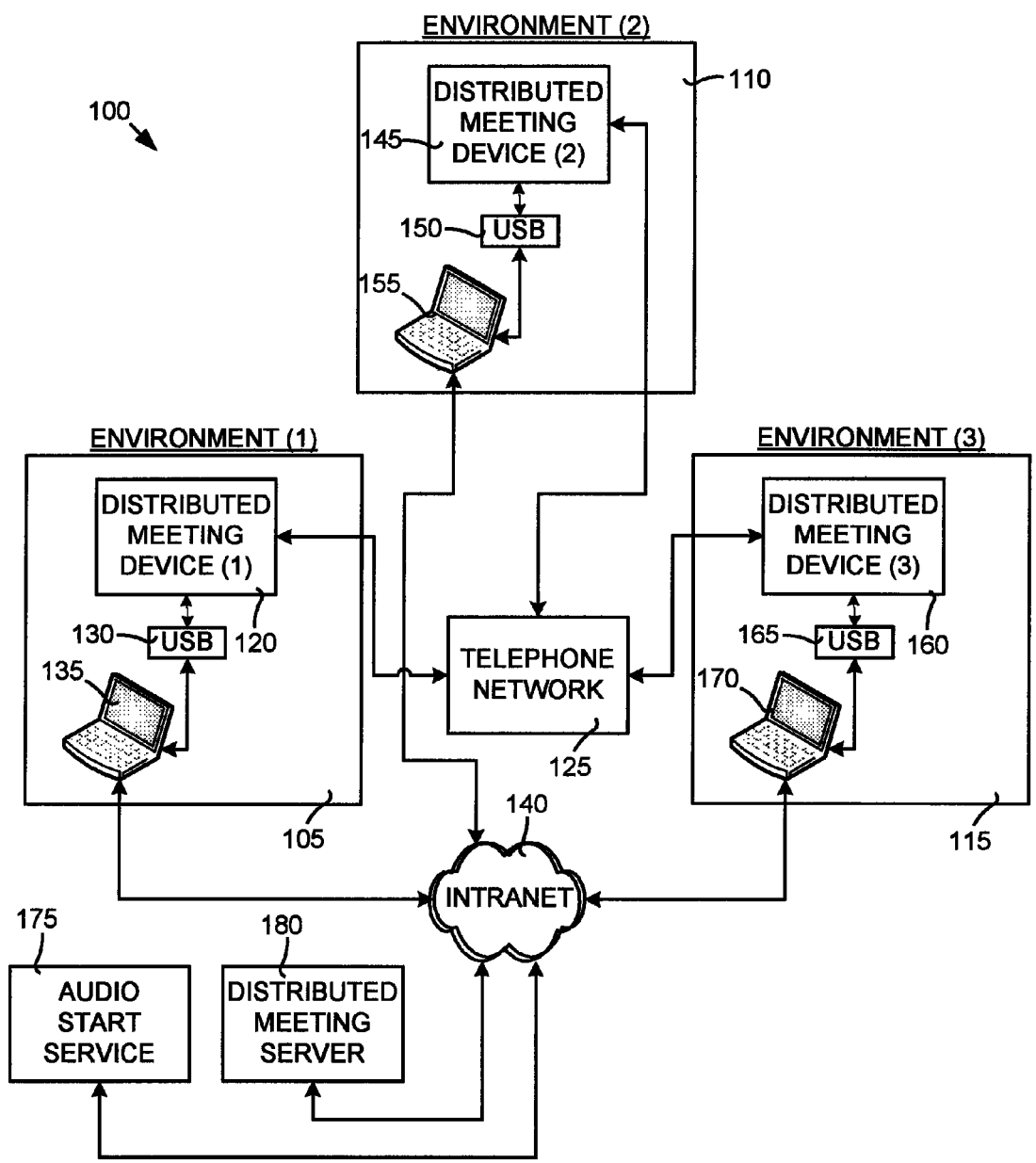
FIG. 1 is a block diagram illustrating an exemplary implementation of the audio start service method disclosed herein.

FIG. 1 is a block diagram illustrating an exemplary implementation of the audio start service environment 100 (including the audio start service disclosed herein). It should be noted that FIG. 1 is merely one of several ways in which the audio start service method may be implemented and used. The audio start service method may be implemented on various types of processing systems, such as on a central processing unit (CPU) or multi-core processing systems.

Referring to FIG. 1, the audio start service environment 100 includes three participants in an ad hoc meeting. Only three participants are shown for ease of illustration. However, it should be noted that the audio start service environment 100 can accommodate a virtually unlimited number of meeting participants and as few as two meeting participants. In fact, since the meeting is ad hoc, two or three meeting participants is a common situation.

As shown in FIG. 1, a first meeting participant is located in Environment (1) 105, a second meeting participant is located in Environment (2) 110, and a third meeting participant is located in Environment (3) 115. By way of example, Environments (1), (2), (3) 105, 110, 115, may be the offices of the participants. In Environment (1), the first meeting participant has a first distributed meeting device 120. The first distributed meeting (DM) device 120 is a device that allows the first meeting participant to participate in distributed meetings (such as Live Meeting® by Microsoft®).

The first DM device 120 is connected to a telephone network 125. The telephone network 125 is meant to represent an audio service that is serving as a bridge. The audio service could be a voice over IP (VoIP), a public system telephone network (PSTN), or some other audio service. The first DM device 120 includes a first universal serial bus (USB) port 130 so that a first laptop computer 135 (or other type of processing device) can be connected to the first DM device 120. The first laptop computer 135 is connected to computer network, such as an Intranet 140.

It should be noted that any of the distributed meeting devices discussed herein may be a plurality of devices that accomplish the task of allowing a meeting participant to participate in a distributed meeting. For example, a distributed meeting device may include a device that can connect to the telephone network 125 (such as a desktop telephone or smartphone) and a computing device having a way to connect to a computer network.

A second DM device 145 is connected to the telephone network 125 and includes a second USB port 150. This allows a second laptop computer 155 to be connected to the second DM device 145 through the second USB port 150. The second laptop computer 155 is connected to the Intranet 140. A third DM device 160 is connected to the telephone network 140 and includes a third USB port 165 into which a third laptop computer 170 can connect. The third laptop computer 170 is connected to the Intranet 140.

An audio start service 175 and a distributed meeting server 180 are connected to the Intranet 140. Although shown as a stand alone components in FIG. 1, the audio start service 175 and the distributed meeting server 180 may reside on the same computing device and may even be located on one of the DM devices or laptop computers. The audio start service 175 maintains an audio start table (discussed in detail below) that tracks which DM devices are involved in the ad hoc meeting.

In addition, the audio start service 175 obtains and distributes the network address where the ad hoc distributed meeting is occurring to those DM devices requesting to join the meeting. The distributed meeting server 180 facilitates the data transfer and interaction between meeting participants in the distributed meeting. Moreover, the distributed meeting server 180 initially provides the network address to the first participant that request a new distributed meeting. The operation of each of the first, second, and third DM devices 120, 145, 160, the audio start service 175, and the distributed meeting server 180 will be discussed in detail below.

II. Operational Details

Each of the devices and services discussed above will now be discussed in further detail. It should be noted that this is only one of several ways in which the devices and services may operate and interact with each other.

Distributed Meeting Devices

Figure 2:
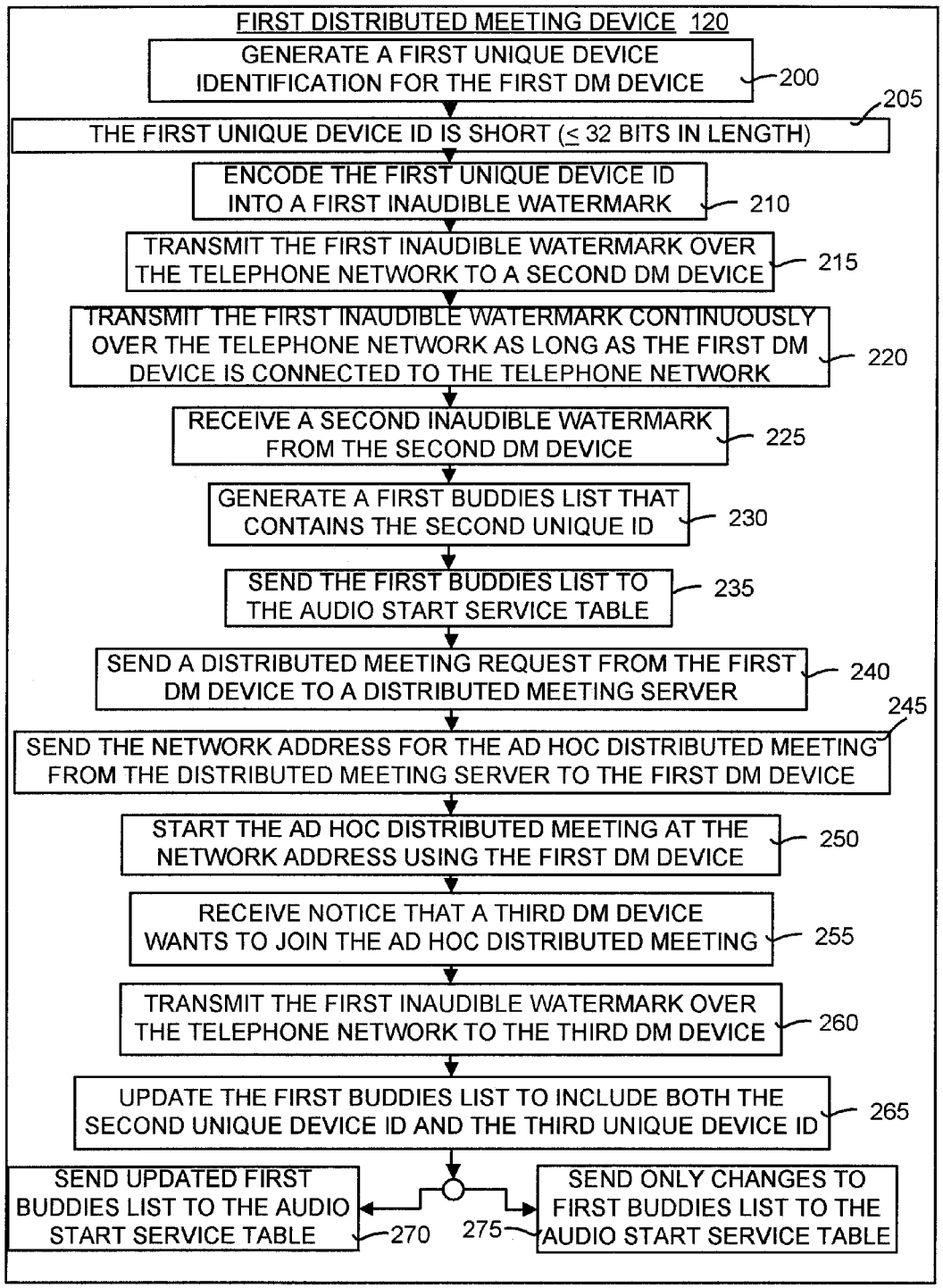
FIG. 2 is a flow diagram illustrating the detailed operation of the first distributed meeting device shown in FIG. 1.

FIG. 2 is a flow diagram illustrating the detailed operation of the first distributed meeting device shown in FIG. 1. The operation begins by generating a first unique device identification (ID) for the first DM device (box 200). The first unique ID is short. In some embodiments, this first unique device ID is less than or equal to about 32 bits in length (box 205). In other embodiments, the first unique device ID may be longer than 32 bits. One key to the audio start service environment 100 is that each device has a unique ID. For example, this ID can all or part of the device's serial number. Moreover, the unique ID is short, to ensure that the unique ID can be transferred over the telephone network at a low bit rate. Thus, the main requirements of a unique device ID is that it be unique and have a short length. The main constraint as to length is that the unique device ID be short enough to be transferred continuously over the telephone network at a low bit rate. Moreover, having a unique ID for each device makes it possible to index a recording of the meeting and identify who is on line and participating in the meeting.

Next, the device 120 encodes the first unique ID into a first inaudible watermark box 210). The first inaudible watermark is transmitted over the telephone network 125 to the second DM device (box 215). In some embodiments, this first inaudible watermark is transmitted continuously over the telephone network 125 as long as the first DM device 120 is connected to the telephone network (box 220). The first DM device 120 also receives a second inaudible watermark from the second DM device (box 225).

In general, if two DM devices are enabled with this invention they can recognize each other over the telephone network 125. Then the two DM devices can transmit a short, unique ID as inaudible watermarks. The inaudible watermark is basically encoding low-amplitude noise signals and speech patterns and is done at a low bit rate. The encoding of inaudible watermarks is well known in the art. Thus, if the unique device ID is 24 bits long and the bit rate is one bit per second, it could take 24 seconds to obtain a 24-bit watermark. The advantage off inaudible watermarks is that they will not interrupt the voice conversations. Inaudible watermarks can happen at any time without interrupting the flow of the meeting. The inaudible watermark enables two DM devices to know who they are talking to. This step eliminates the manual entering of device IDs and is totally automatic, making the perquisite handshaking and identification much easier for the user.

The first DM device 120 then generates a first buddies list (box 230). A buddies list is a list of other DM devices that the first DM device 120 would like to have involved in the ad hoc distributed meeting. In the first buddies list, the other DM devices are identified by their unique device IDs. The first buddies list is send to an audio start service table on the audio start service (box 235). Next, a distributed meeting request is sent by the first DM device 120 to the distributed meeting server (box 240). The distributed meeting server 180 then sends the first DM device 120 a network address for the ad hoc distributed meeting (box 245). This network address is a indicator as to where the DM devices can rendezvous to conduct the ad hoc distributed meeting. In some embodiments, the network address is pre-determined. The network address can be a URI (such as a URL). The first DM device 120 then goes to the network address and starts the ad hoc distributed meeting (box 250).

Up to this point there have only been the first DM device 120 and the second DM device 145 involved in the ad hoc distributed meeting. When the third DM device 160 wants to join the meeting, the first DM device 120 receives notice that the third DM device 160 wants to join the meeting (box 255). The first DM device 120 then transmits the first inaudible watermark over the telephone network 125 to the third DM device (box 260). After this exchange of IDs, the first buddies list is updated to include both the second unique device ID and the third unique device ID (box 265). The updated first buddies list then is sent to the audio start service table. There are at least two ways in which this can occur. In a first embodiment, the first DM device 120 sends the entire updated first buddies list to the audio start service table (box 270). In a second embodiment, only the changes to the first buddies list are sent (box 275). Any additional DM devices that would like to join the meeting are handled by the first DM device 120 in this manner.

Figure 3:
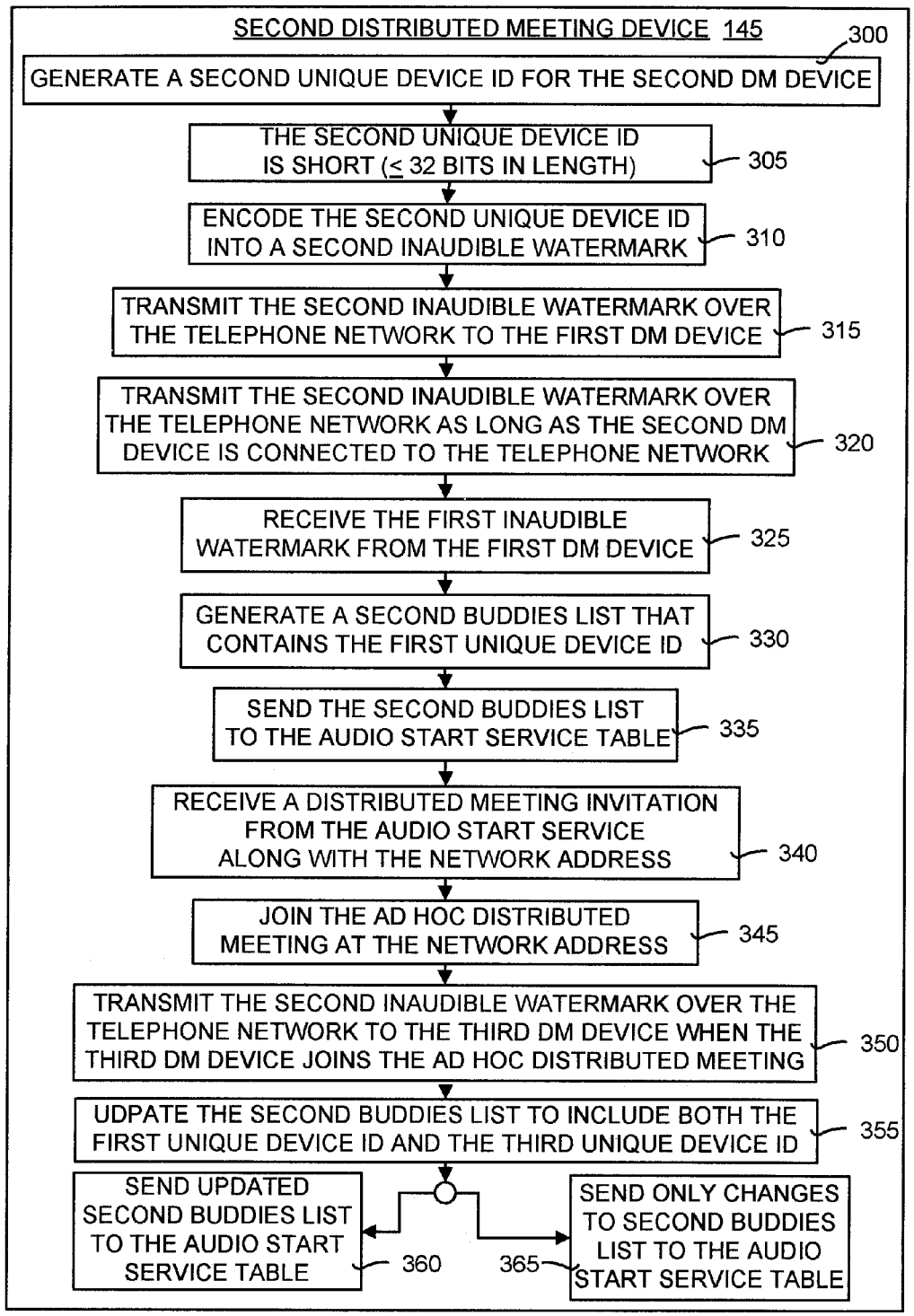
FIG. 3 is a flow diagram illustrating the detailed operation of the second distributed meeting device shown in FIG. 1.

FIG. 3 is a flow diagram illustrating the detailed operation of the second distributed meeting device 145 shown in FIG. 1. As before, the second DM device 145 generates a second unique device ID (box 300). Moreover, this second unique device is short. In some embodiments, this second unique device ID is less than or equal to about 32 in length (box 305). The second unique device ID is encoded into a second inaudible watermark using methods of encoding watermarks that are known (box 310). The second inaudible watermark is transmitted over the telephone network to the first DM device (box 315). In some embodiments, the second inaudible watermark is transmitted over the telephone network as long as the second DM device 145 is connected to the telephone network (box 320). The second DM device 145 receives the first inaudible watermark transmitted over the telephone network 125 from the first DM device (box 325).

The second DM device 145 then generates a second buddies list that contains the first unique device ID (box 330). The second buddies list then is sent to the audio start service table (box 335). The audio start service 175 then sends a distributed meeting invitation along with the network address where the meeting is occurring (box 340). The second DM device 145 then joins the ad hoc distributed meeting at the network address (box 345).

When the third DM device 160 joins the meeting, the second DM device 145 transmits the second inaudible watermark over the telephone network 125 to the third DM device (box 350). The second buddies list then is updated to include both the first unique device ID and the third unique device ID (box 355). As with the first DM device 120, there are at least two ways in which this can occur. In a first embodiment, the second DM device 145 sends the entire updated second buddies list to the audio start service table (box 360). In a second embodiment, only the changes to the second buddies list are sent to the audio start service table (box 365).

Figure 4:
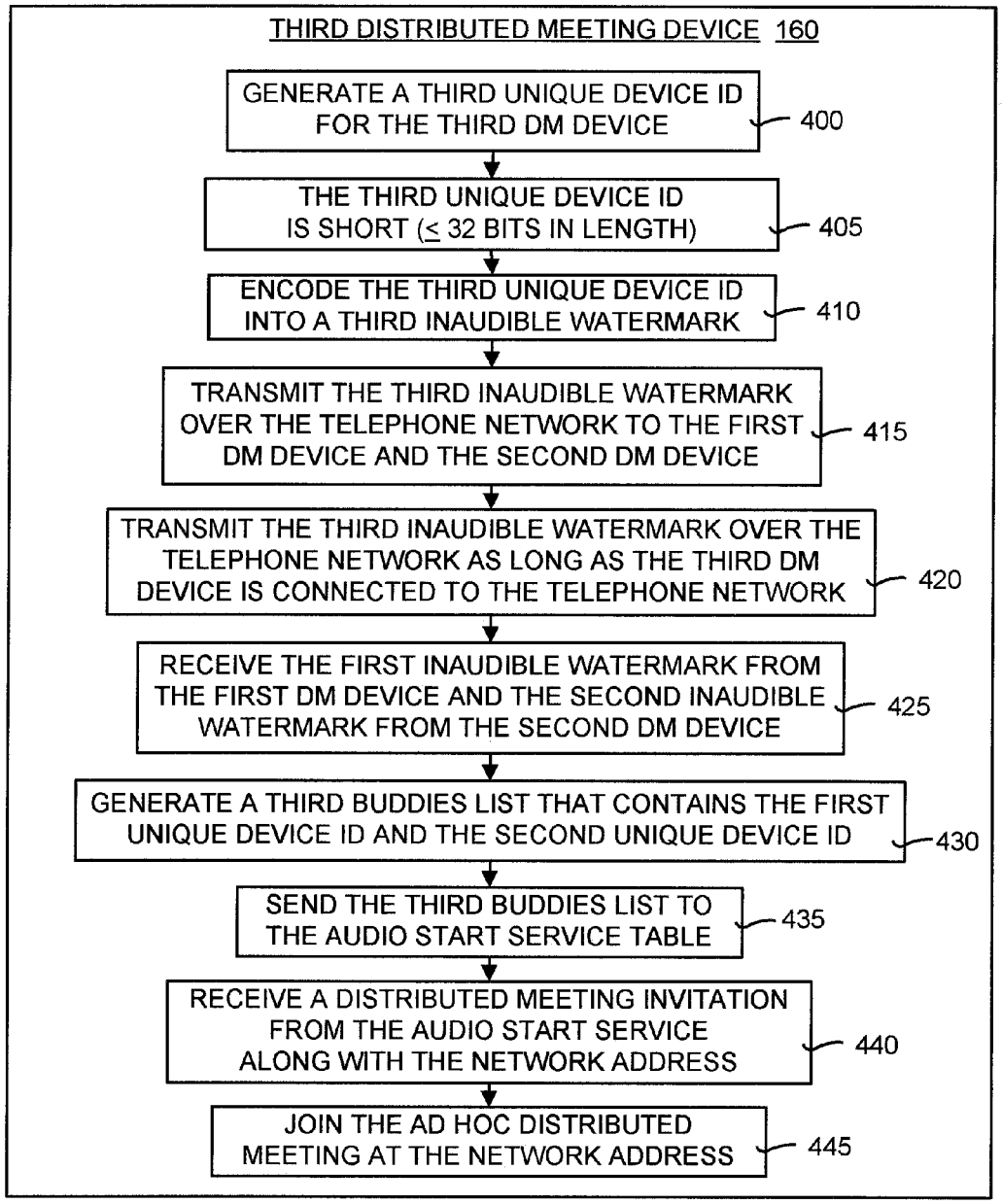
FIG. 4 is a flow diagram illustrating the detailed operation of the third distributed meeting device shown in FIG. 1.

FIG. 4 is a flow diagram illustrating the detailed operation of the third distributed meeting device shown in FIG. 1. The operation begins by generating a third unique device ID for the third DM device (box 400). The third unique device ID is short. In some embodiments, the length of the third unique device ID is less than or equal to about 32 bits (box 405). The third unique device ID is encoded into a third inaudible watermark (box 410).

The third inaudible watermark is transmitted over the telephone network 125 to the first DM device 120 and the second DM device (box 415). In some embodiments, the third inaudible watermark is transmitted over the telephone network 125 as long as the third DM device 160 is connected to the telephone network (box 420). In addition, the first inaudible watermark is received from the first DM device 120 and the second inaudible watermark is received from the second DM device (box 425).

A third buddies list is generated such that the list contains the first unique device ID and the second unique device ID (box 430). The third buddies list is sent to the audio start service (box 435). A distributed meeting invitation is received from the audio start service 175 along with the network address where the third DM device 160 can rendezvous with the other DM devices and hold the ad hoc DM meeting (box 440). The third DM device 160 then joins the meeting at the network address (box 445).

Audio Start Service

Figure 5:
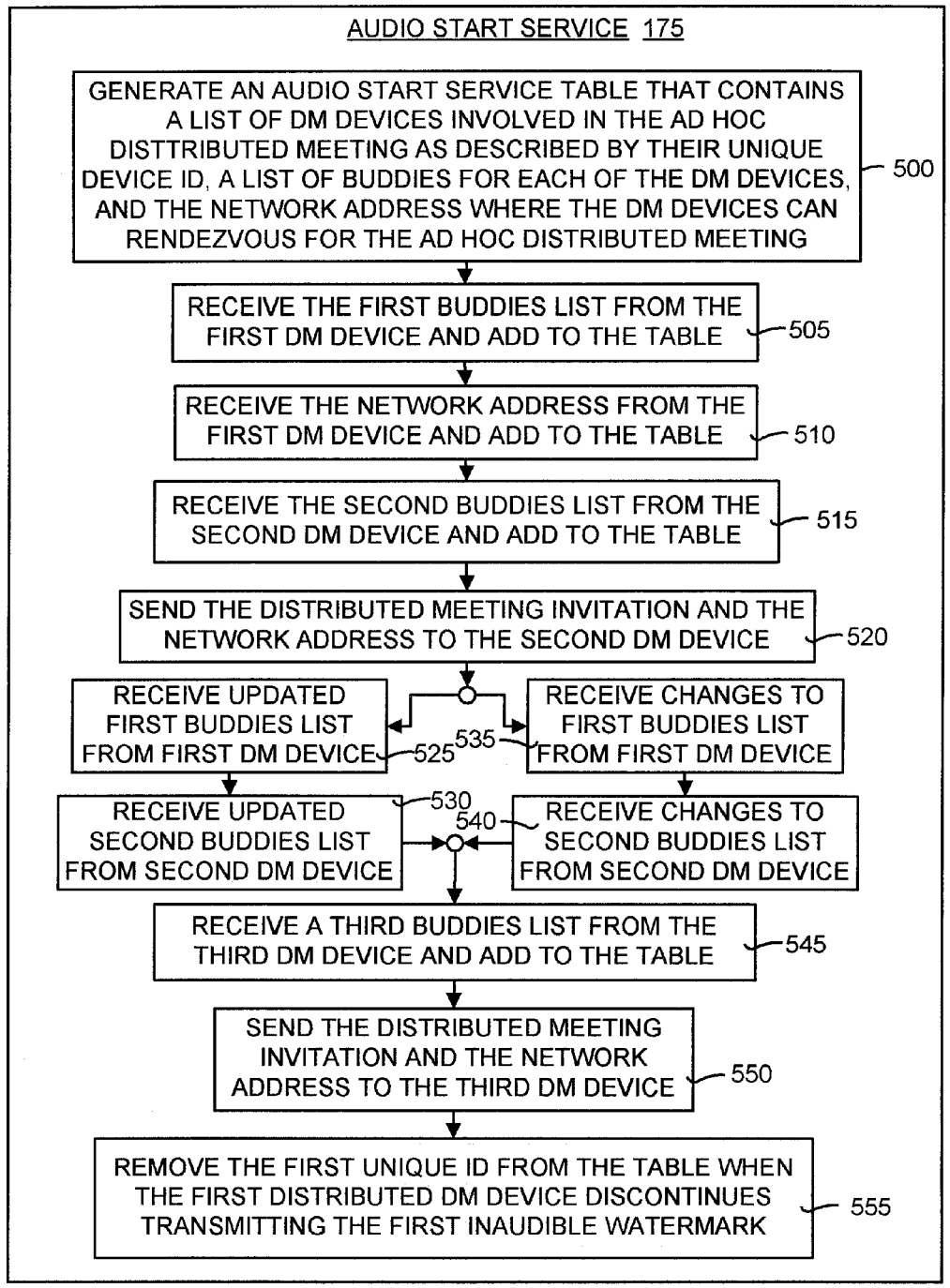
FIG. 5 is a flow diagram illustrating the detailed operation of the audio start service shown in FIG. 1.

FIG. 5 is a flow diagram illustrating the detailed operation of the audio start service 175 shown in FIG. 1. In general, the audio start service 175 maintains an audio start service table that allows DM devices to schedule and conduct an ad hoc distributed meeting. The audio start service 175 initially generates the audio start service table (box 500). The table contains a list of DM devices that are described by their unique device IDs, a list of buddies for each of the DM devices, and the network address where the DM devices can rendezvous to hold the ad hoc distributed meeting.

The audio start service 160 receives the first buddies list from the first DM device 120 and add this information to the table (box 505). Once the first DM device 120 receives the network address from the distributed meeting server 180, then the first DM device 120 sends the network address to the audio start service 175 and the network address is added to the table (box 510). The audio start service 175 also receives the second buddies list from the second DM device 145 and adds this information to the table (box 515). Using the audio start service table, the audio start service 175 sends a distributed meeting invitation along with the network address to the second DM device (box 520).

Updates to the audio start service table are handled in one of two ways. In one embodiment, the audio start service 175 receives an updated first buddies list from the first DM device (box 525) and an updated second buddies list from the second DM device (box 530). In a second embodiment, the audio start service 175 receives from the first DM device 120 only the changes to the first buddies list (box 535). Similarly, the service 175 receives from the second DM device 145 only the changes to the second buddies list (box 540).

When the third DM device 160 joins the meeting, the audio start service 175 receives the third buddies list from the third DM device (box 545). This information then is added to the audio start service table. The distributed meeting invitation is sent to the third DM device 160 along with the network address (box 550). When the first DM device 120 wants to remove itself from the meeting, the first unique device ID is removed from the table (box 555). The indication that the first DM device 120 has left the meeting is when it stops transmitting the first inaudible watermark over the telephone network 125. Because the inaudible watermark is sent at such a low bit rate, it may take a minute or longer to realize that the first DM device 120 has disconnected from the meeting. Any other DM devices that disconnect from the meeting are handled in the same manner as described above for the first DM device 120.

Distributed Meeting Server

Figure 6:
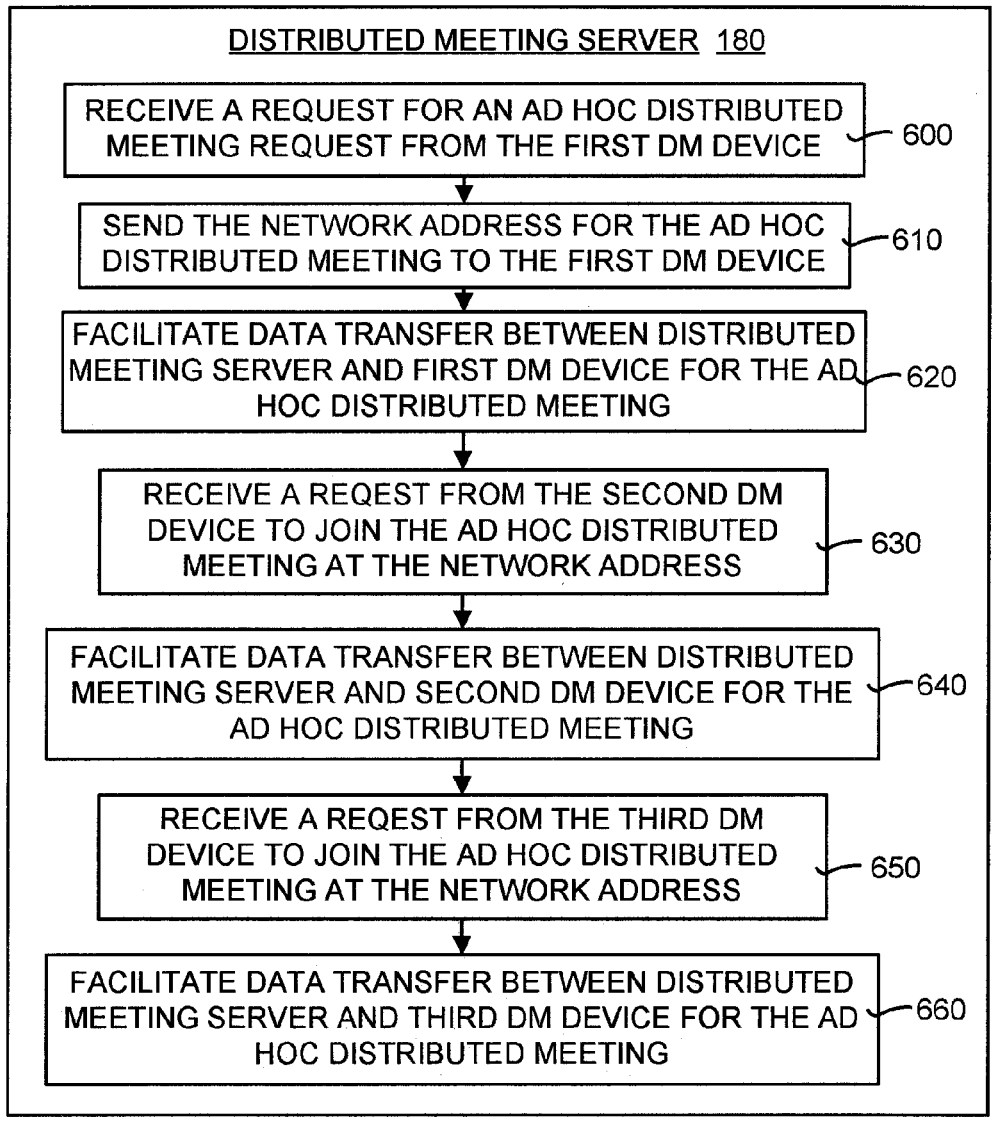
FIG. 6 is a flow diagram illustrating the detailed operation of the distributed meeting server shown in FIG. 1.

In general, the distributed meeting server 180 facilitates the connection at a common network address of multiple DM devices that are participating in the ad hoc distributed meeting. In particular, FIG. 6 is a flow diagram illustrating the detailed operation of the distributed meeting server shown in FIG. 1. The server 180 receives a request for an ad hoc distributed meeting from the first DM device (box 600). The server 180 then send the network address for the meeting to the first DM device (box 610). In some embodiments, the network address is predetermined and known initially only to the server 180.

The server 180 then facilitates data transfer between the server 180 and the first DM device 120 such that the ad hoc distributed meeting is commenced (box 620). At some future time, which may be seconds, minutes, or longer, the server 180 receives a request from the second DM device 145 to join the ad hoc distributed meeting at the network address (box 630). The server 180 then facilitates data transfer between itself and the second DM device 145 such that there are two participants in the meeting (box 640), namely the first DM device 120 and the second DM device 145. At some future time the server 180 then receives a request from the third DM device 160 to join the ad hoc distributed meeting (box 650). Then the server facilitates data transfer between itself and the third DM device 160 such that there are now three participants in the meeting (box 660), namely the first DM device 120, the second DM device 145, and the third DM device 160. Any additional DM devices that wish to join are handled in the same manner. When DM devices disconnect from the meeting, the server 180 stops facilitating data transfer between itself and the disconnecting DM device.

Sequence Diagram and Commands

To aid in the understanding of the audio start service method, an exemplary example will be discussed. In general, the flow of this example is as follows. First, a first meeting participant calls through the telephone network, a second meeting participant calls through the telephone network, and then the first DM device 120 and the second DM device 145 detect each other. By way of example, an LCD monitor at both location then could display the message "to upgrade this session to a DM data video session, plug in your PC."

Assume that the first meeting participant wants to introduce a new team member and review some results, so he decides to upgrade the audio call to a DM data video session, so he plugs his first DM device 120 into his first laptop computer 135. The second meeting participant plugs her second DM device 145 into her second laptop computer 155. As soon as the first meeting participant plugs in the distributed meeting application starts. At this point, the second meeting participant receives a DM meeting notice and starts accepting the DM meeting.

The third meeting participant joins the meeting late. He gets a meeting notice and joins by accepting the meeting notice. The first meeting participant has to leave early, but the second and third meeting participants can continue the meeting without him, so the first meeting participant is removed as a meeting buddy.

Figure 7:
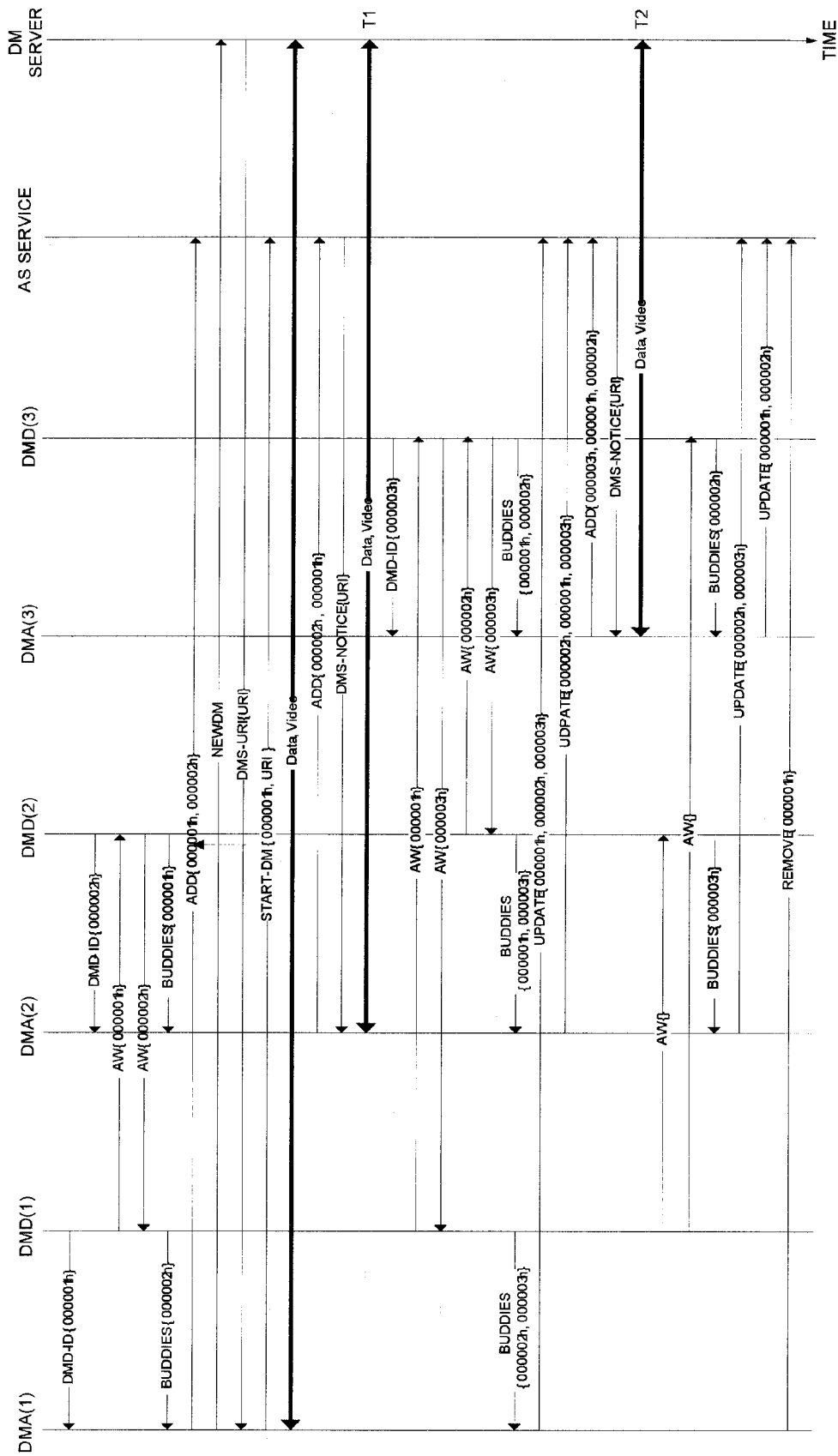
FIG. 7 is a sequence diagram illustrating an exemplary implementation of the audio start service method shown in FIGS. 1-6.

More specifically, FIG. 7 is a sequence diagram illustrating an exemplary implementation of the audio start service environment 100 shown in FIGS. 1-6. The sequence diagram of FIG. 7 is only one of several different ways in which the audio start service environment 100 may be implemented.

Sequence diagrams are common in the communications field when describing communication protocols. As shown in FIG. 7, the sequence diagram has time in the down direction (such that time advances as one goes down the paper). Moreover, the sequence diagram contains endpoints or services across the top, which in this case is devices or applications that will send or receive a message.

Referring to FIG. 7, looking across the top row of the diagram are the distributed meeting applications (DMA) and the distributed meeting devices (DMD). In this sequence diagram, the distributed meeting application (which is the actual software running on the DM device) are separate from the DM device (or DMD). In particular, from left to right are DMA(1), DMD(1), DMA(2), DMD(2), DMA(3), DMD(3), as well as the Audio Start (AS) Service and the distributed meeting (DM) Server. The DMA(1) runs on DMD(1), the DMA(2) runs on DMD(2), and the DMA(3) runs on DMD(3). It should be noted that in some embodiments the AS Server and the DM Server run on the same computing device. However, for purposes of this diagram they will be divided to better illustrate their functionality.

Preparatory to discussing the sequence diagram of FIG. 7, the commands used in the diagram now will be discussed. The commands are messages or actions that are sent between devices. The following commands {and their arguments} are used in the audio start service environment 100 and incorporated audio start service:

| Command | Description |
| --- | --- |
| ADD{unique device ID, buddies}: | Adds unique device IDs and buddies to the audio start service table RT Ids and buddies to table. |
| AW{unique device ID}: | Represents an inaudible watermark transmission of a unique device ID. |
| BUDDIES{buddies}: | Returns a list of buddies. |
| UPDATE{unique device ID, buddies}: | Updates the list of buddies. |
| REMOVE{unique device ID}: | Removes buddies from the audio start service table. |
| START-DM{unique device ID, URI}: | For all buddies of the given DM device, this command updates the URI (or network address) and facilitates a data transfer between the DM device and the DM server. |
| DMD-ID{unique device ID}: | Is a USB transfer of the unique device ID from the DM device to another device (or vice versa). |
| DMS-URI{URI}: | A URI (or network address) sent from the DM Server to a DM device. |
| DMS-NOTICE{URI}: | An ad hoc distributed meeting notification that is sent from the AS Service to the DM device or application. |

Referring again to FIG. 7, the sequence of events on the sequence diagram will now be discussed with reference to FIG. 1. Initially, a first meeting participant plugs his first DM device 120 into the first DM application and then the first DM device 120 send its first unique device ID to the first DM application. Now the first DM application knows which DM device to which it is connected. This is done with the DMD-ID command going from DMD(1) to DMA(1). Next, the same thing happens for a second meeting participant using the DMD-ID command from DMD(2) to DMA(2).

Each of the first and the second unique device IDs then are encoded into an inaudible watermark. These are exchanged between the first DM device 120 and the second DM device 145 using the AW command. First, the AW command goes from DMD(1) to DMD(2). In this case, the first unique device ID is "000001h". Next, the AW command goes from DMD(2) to DMD(1), and in this case the second unique device ID is "000002h".

Next, both the first DM device 120 (DMD(1)) and the second DM device 145 (DMD(2)) send a respective buddies message. A BUDDIES command is sent from DMD(1) to DMA(1), stating that "000002h" is a buddy, and from DMD (2) to DMA(2), stating that "000001 h" is a buddy. Then the ADD command is sent from DMA(1) to the AS Service (the audio start service 175) that adds the first DM device 120 to the audio start service table and identifies the second DM device 145 as a buddy. Then the NEW-DM command is sent from DMA(1) to the DM Server (distributed meeting server 180) to request the DM Server to start up a new ad hoc distributed meeting. The DMS-URI command then is sent from the DM Server to the DMA(1) that gives the first DM device 120 the network address (or URI).

The START-DM command then is sent from the DMA(1) to the AS Service so that the first DM device 120 passes the network address (or URI) along to the AS Service. At this point the AS Service has a URI that is associated to the first DM device 120. The first DM device 120 then can start up a distributed meeting on the DM Server such that data is transferred from the DM Server. Once the first DM device 120 is connected to the DM Server then any other DM device can join the meeting.

Meanwhile, the ADD command is sent between DMD(2) and the AS Service that adds the second DM device 145 to the audio start service table and identifies the first DM device 120 as a buddy. The DMS-NOTICE command then is sent from the AS Service to the DMA(2) that gives the second DM device 145 the network address (or URI) of the meeting. Note that this is automatic and there is no need for a specific request by the second DM device 145. The second DM device 145 then joins the meeting and is able to transfer data and video through the DM Server.

The remainder of the sequence diagram in FIG. 7 illustrates how a DM device can be added or removed from the audio start service environment 100. At time T1, the third DM device 160 wants to join the meeting. At this point, a third user plugs her third DM device 160 into the third DM application (DMA(3). The DMD-ID command is used to send the third unique device ID from DMD(3) to DMA(3). In this case, the third unique device ID is "000003h". Next, the AW command is used to send the first inaudible watermark from DMD(1) to DMD(3) and send the third inaudible watermark from DMD (3) to DMD(1). Similarly, inaudible watermarks are exchanged by DMD(2) and DMD(3) using the AW command.

Next, both DMD(1) and DMD(2) update their buddies list using the BUDDIES command. Moreover, a BUDDIES command is sent from DMD(3) to DMA(3) stating that "000001h" and "000002h" are buddies. Then the UPDATE command is used to send the update first buddies list from DMA(1) to AS Server and the updated second buddies list from DMA(2) to AS Server. In some embodiments this is done incrementally such that only the changes to the buddies lists are sent instead of the entire list. If there were hundreds, or even thousands of participants in the meeting then the incremental update embodiment probably is desirable. FIG. 7 illustrates the embodiment where the entire buddies list is sent.

The ADD command then is sent from DMA(3) to the AS Service that add the third DM device 160 to the audio start service table and identifies the third DM device 160 as a buddy to the first DM device 120 and the second DM device 145. The DMS-NOTICE command then is sent from the AS Service to the DMA(3) that gives the third DM device 160 the network address (or URI) of the meeting. Note that this is automatic and there is no need for a specific request by the third DM device 160. The third DM device 160 then joins the meeting and is able to transfer data and video through the DM Server. A virtually unlimited number of additional DM devices may be added to the meeting using the same process as described above for the third DM device 160.

At time T2 the first DM device 120 leaves the meeting. This is first detected by an absence of inaudible watermark transmission over the telephone network from the first DM device 120 to the second DM device 145 and the third DM device 160. As shown in FIG. 7, the AW command from DMD(1) to DMD(2) is empty and the AW command from DMD(1) to DMD(3) also is empty.

The BUDDIES command is used to update the second buddies list by sending the command from DMD(2) to DMA(2) and update the third buddies list by sending the command from DMD(3) to DMA(3). Then the UPDATE command is used to send the update second buddies list from DMA(2) to AS Server and the updated third buddies list from DMA(3) to AS Server. As stated above, in some embodiments this is done incrementally. The DMA(1) then sends a REMOVE command to the AS Service notifying the AS Server to remove the first unique device ID from the audio start service table.

After time T2, the first DM device 120 is no longer transmitting the first inaudible watermark. When the first DM device 120 hangs up then he is no longer sending the first inaudible watermark over the telephone network 125. This could take a few seconds, since complete inaudible watermarks are sent every 24 to 32 seconds (in some implementations). Thus, after about a minute of no watermark, one can assume that the DM device has disconnected. Even though the first DM device 120 has removed itself from the meeting, it should be noted that the network address (or URI) will continue to exist as long as someone is involved in the meeting. Once all participants are removed, then the URI becomes stale or inactive.

Audio Start Service Table

FIG. 8 illustrates an exemplary implementation of the audio start service table at time T1 as shown in FIG. 7. As can be seen from FIG. 8, the audio start service table includes the unique device ID for a DM device (DMD-ID), Buddies of the respective DM devices, and the network address (or URI) of the meeting given by the distributed meeting server (DMS-URI). At time T1 shown in FIG. 7, the first row of the table in FIG. 8 shows that the first DM device 120 (000001h) has one buddy that is the second DM device 145 (000002h). In addition, the URI is shown where the meeting rendezvous is occurring. In the second row of the table in FIG. 8, the second DM device 145 (000002h) has a single buddy of the first DM device 120 (000001h) and the same URI. This is the URI that the first DM device 120 and the second DM device 145 use to join a meeting to talk with each other.

FIG. 9 illustrates an exemplary implementation of the audio start service table at time T2 as shown in FIG. 7. As shown in the table of FIG. 9, once the third DM device 160 joins the meeting then there are 3 DM devices taking part in the meeting. As can be seen from the table in FIG. 9, buddies for the first DM device 120 are the second DM device 145 and the third DM device 160. In addition, the buddies for the second DM device 145 are the first DM device 120 and the third DM device 160, and buddies for the third DM device 160 are the first DM device 120 and the second DM device 145. Knowing who your buddies are allows a user to figure out who to talk to and defines a meeting with only a click.

III. Exemplary Operating Environment

The audio start service method is designed to operate in a computing environment. The following discussion is intended to provide a brief, general description of a suitable computing environment in which the audio start service method may be implemented.

Figure 10:
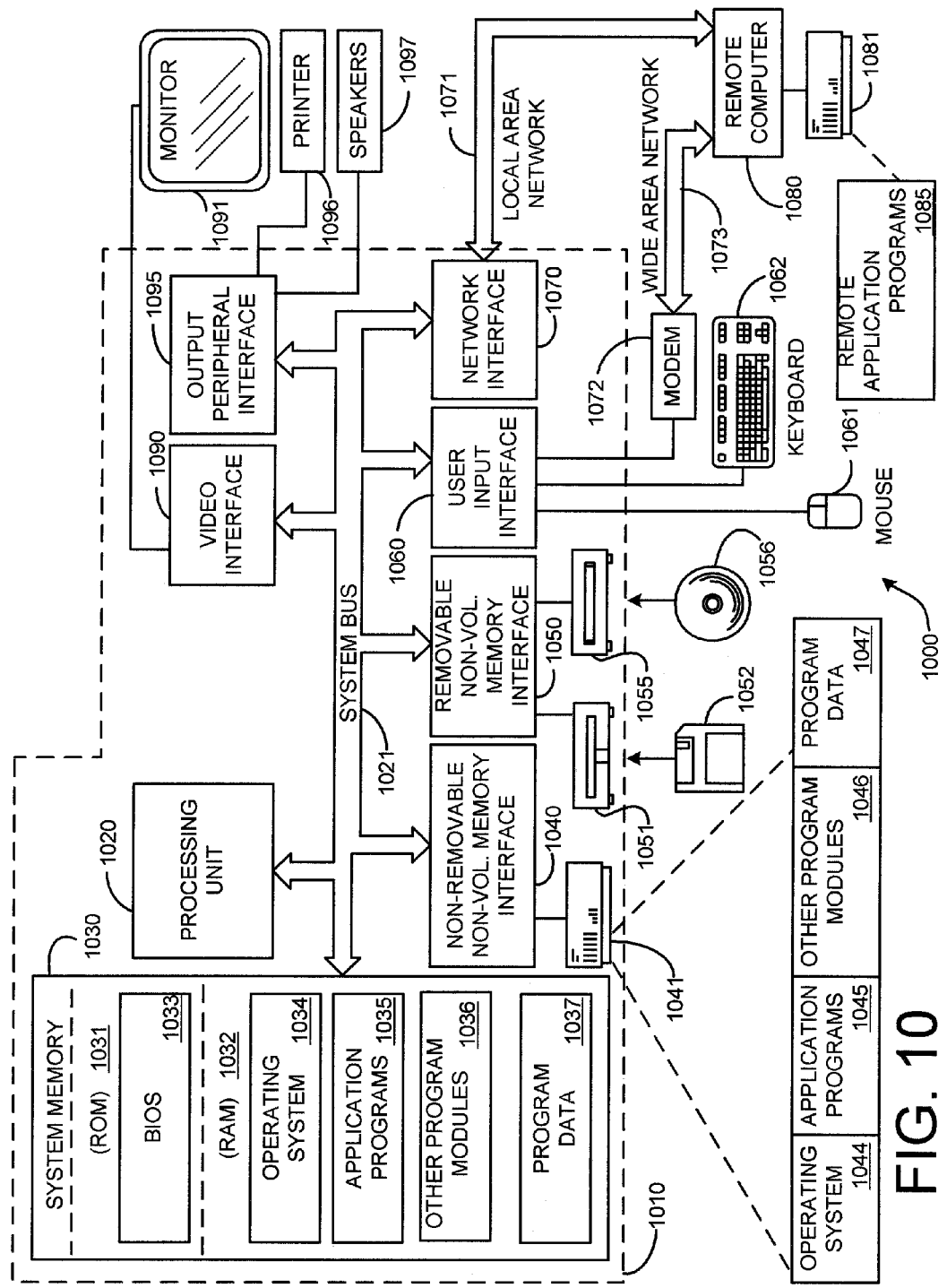
FIG. 10 illustrates an example of a suitable computing system environment in which the audio start service method shown in FIGS. 1-9 may be implemented.

FIG. 10 illustrates an example of a suitable computing system environment in which the audio start service method shown in FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

The audio start service method is operational with numerous other general purpose or special purpose computing system environments or configurations. Examples of well known computing systems, environments, and/or configurations that may be suitable for use with the audio start service method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The audio start service method may be described in the general context of computer-executable instructions, such as program modules, being executed by a computer. Generally, program modules include routines, programs, objects, components, data structures, etc., that perform particular tasks or implement particular abstract data types. The audio start service method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for the audio start service method includes a general-purpose computing device in the form of a computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1040 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 typically are connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for transmitting device identifications over a telephone network to schedule an ad hoc meeting between a first distributed meeting device and a second distributed meeting device, comprising:
   generating a first unique device identification for the first distributed meeting device and a second unique device identification for the second distributed meeting device;
   encoding the first unique device identification into a first inaudible watermark and the second unique device identification into a second inaudible watermark; and
   transmitting the first inaudible watermark continuously over the telephone network to the second distributed meeting device as long as the first distributed meeting device is connected to the telephone network and transmitting the second inaudible watermark over the telephone network to the first distributed meeting device;
   obtaining a network address where the first and the second distributed meeting devices can rendezvous for the ad hoc meeting;
   generating an audio start service table that contains a list of distributed meeting devices involved in the ad hoc meeting as described by their unique device identification, a list of buddies for each of the distributed meeting devices as described by their unique device identification, and the network address sent by the first distributed device.

2. The method of claim 1, further comprising:
   generating a first buddies list for the first distributed meeting device that contains the second unique device identification, wherein the first buddies list represents a list of distributed meeting devices with whom the first distributed meeting device exchanges its first unique device identification; and
   generating a second buddies list for the second distributed meeting device that contains the first unique device identification, wherein the second buddies list represents a list of distributed meeting device with which the second distributed meeting device exchanges its second unique device identification.

3. The method of claim 2, further comprising adding the following to the audio start service table: (1) the first unique device identification; (2) the first buddies list; and (3) the network address.

4. The method of claim 3, further comprising:
   sending a distributed meeting request from the first distributed meeting device to a distributed meeting server;
   sending the network address for the ad hoc meeting from the distributed meeting device to the first distributed meeting device; and
   starting the ad hoc meeting at the network address using the first distributed meeting device.

5. The method of claim 4, further comprising adding the following to the audio start service table: (1) the second unique device identification; and (2) the second buddies list.

6. The method of claim 5, further comprising:
   sending a distributed meeting invitation from the distributed meeting server to the second distributed meeting device along with the network address; and
   joining the ad hoc meeting at the network address using the second distributed meeting device.

7. The method of claim 1, wherein the first and the second unique device identifications are less than or equal to 32 bits long.

8. The method of claim 6, further comprising:
   generating a third unique device identification for a third distributed meeting device;
   encoding the third unique device identification into a third inaudible watermark; and
   transmitting the first inaudible watermark over the telephone network to the third distributed meeting device and transmitting the third inaudible watermark over the telephone network to the first distributed meeting device.

9. The method of claim 8, further comprising transmitting the second inaudible watermark over the telephone network to the third distributed meeting device and transmitting the third inaudible watermark over the telephone network to the second distributed meeting device.

10. The method of claim 9, further comprising generating a third buddies list for the third distributed meeting device that contains the first and the second unique device identifications, wherein the third buddies list represents a list of distributed meeting devices with whom the third distributed meeting device exchanges its third unique device identification.

11. The method of claim 10, further comprising:
    updating the first buddies list to contain both the second unique device identification and the third unique device identification; and
    updating the second buddies list to contain both the first unique device identification and the third unique device identification.

12. The method of claim 11, further comprising:
    updating the first buddies list to contain both the second unique device identification and the third unique device identification; and
    updating the second buddies list to contain both the first unique device identification and the third unique device identification.

13. The method of claim 12, further comprising:
    sending the updated first buddies list, the updated second buddies list, and the updated third buddies list to the audio start service table; and
    updating the audio start service table based on the first buddies list, the second buddies list, and the third buddies list.

14. The method of claim 13, further comprising:
    sending only changes made to the first buddies list, the second buddies list, and the third buddies list to the audio start service table; and
    updating the audio start service table based on the changes made to the first buddies list, the second buddies list, and the third buddies list.

15. The method of claim 14, further comprising removing the first unique device identification from the audio start service table when the first distributed meeting device discontinues transmitting the first inaudible watermark signifying that the first distributed meeting device has disconnected from the telephone network.

16. A computer-implemented process for a first distributed meeting device to notify a second distributed meeting device of a distributed meeting, comprising:
    encoding a first unique device identification representing the first distributed meeting device into a first inaudible watermark and a second unique identification representing the second distributed meeting device into a second inaudible watermark;
    sending the first unique device identification continuously from the first distributed meeting device to the second distributed meeting device and sending the second unique device identification from the second distributed meeting device to the first distributed meeting device;

obtaining a network address for the distributed meeting by sending the network address from a distributed meeting server to the first distributed meeting device;

sending the network address from the first distributed device to an audio start service table;

sending the network address from the audio start service table to the second distributed meeting device;

conducting the distributed meeting between the first and the second distributed meeting devices at the network address; and using the audio start service table to automatically send a third distributed meeting device a meeting invitation and the network address when the third distributed meeting device desires to join the ad hoc meeting.

* * * * *